March 6, 1956 — G. J. MICHONSKI — 2,737,154
EXPANSIBLE DOG LEASH
Filed Jan. 13, 1955
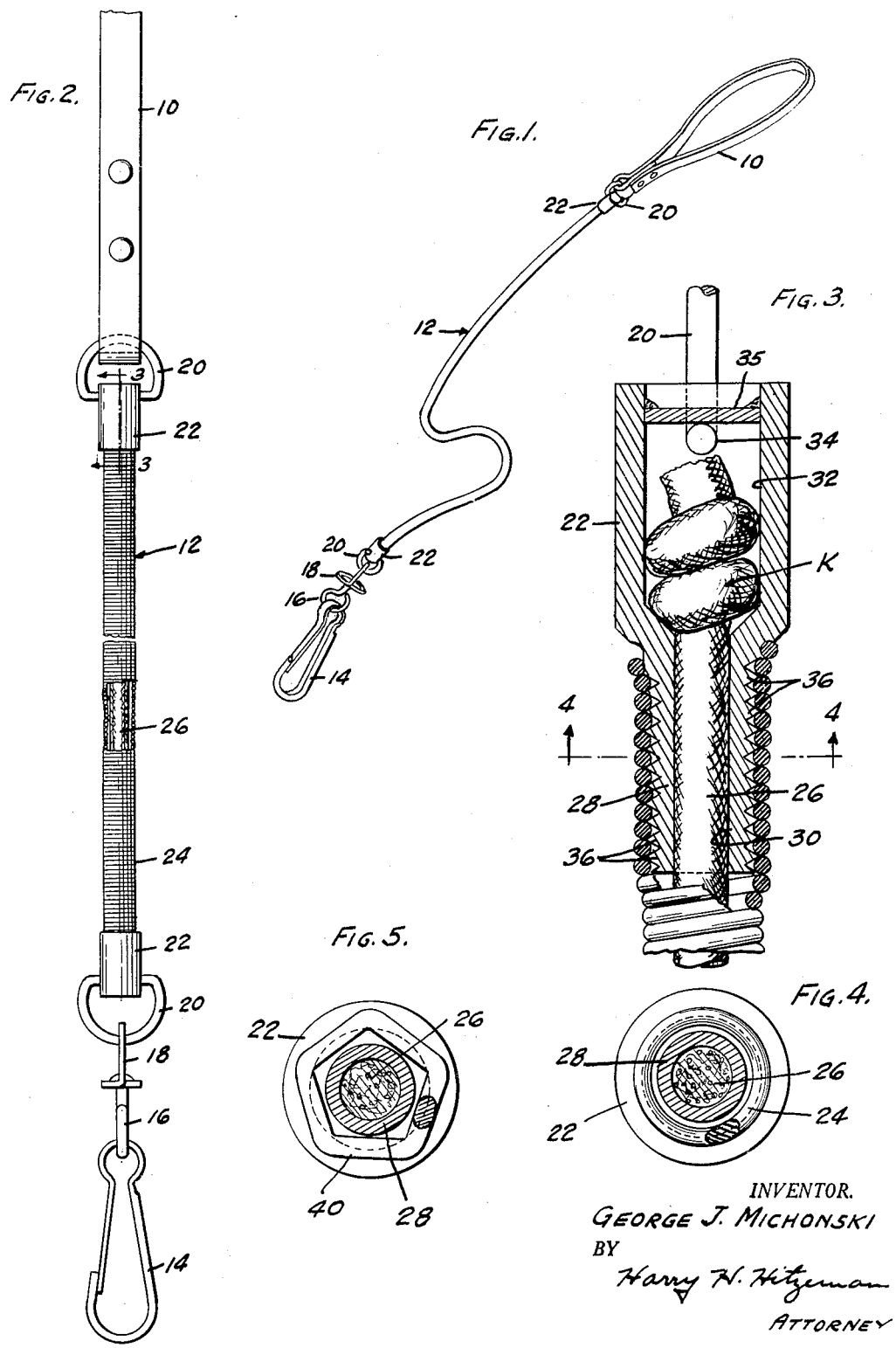
INVENTOR.
GEORGE J. MICHONSKI
BY Harry N. Hitzeman
ATTORNEY

United States Patent Office 2,737,154
Patented Mar. 6, 1956

2,737,154

EXPANSIBLE DOG LEASH

George J. Michonski, Skokie, Ill.

Application January 13, 1955, Serial No. 481,549

2 Claims. (Cl. 119—109)

My invention relates to improvements in leashes or tethers.

My invention relates more particularly to a leash or tether for animals or children, and has as an object to provide a leash for effectually obtaining positive control over the animal or child in guiding and restraining the same while at the same time permitting limited freedom of travel.

The principal object of the present invention is to provide an improved leash of the type described which has a certain amount of elasticity, yet which is so constructed that the elastic member is incorporated within a coiled spring covering which assists both in taking the pull that is applied to the elastic member and also in returning the same to normal condition.

A further object of the invention is to provide an improved leash structure which prevents twisting or turning of the elastic cord that is connected between the handle and the snap hook for connection to the collar of an animal or the harness of a small child.

A further object of the invention is to provide a flexible leash which will remain inert during the normal travel of the animal but which will become tensioned when there is any sudden pull or jerk on the leash, so that the shock of such sudden pull or jerk is partially absorbed both by the animal or child and by the restraining hand on the handle of the leash.

A further object of the invention is to provide an improved construction of leash wherein the combined action of an elastic cord and an expansible spring member is utilized, the spring member in this instance also acting as a covering or protector for the elastic cord and also as a positive force for returning the cord back to normal length after the same has been stretched.

A further object of the invention is to provide a construction of the type described wherein the coiled spring member which surrounds the elastic cord may be constructed in a plurality of different or unique designs, thereby greatly enhancing the overall appearance of the leash.

Other objects and advantages will be more apparent from the following description wherein reference is had to the accompanying drawing, upon which Fig. 1 is a perspective view of a leash drawn to a reduced scale constructed in accordance with my invention;

Fig. 2 is a full size side elevational view of the same with parts broken in section and the cord and handle foreshortened;

Fig. 3 is an enlarged cross-sectional view through the coupler at both ends of the leash cord, the view being taken generally on the line 3—3 of Fig. 2;

Fig. 4 is a transverse view of the coupler taken on the line 4—4 of Fig. 3; and

Fig. 5 is a similar transverse view through the coupler showing the manner in which a pentagon shaped spring member may be fastened to the coupler.

In the embodiment of the invention which I have chosen to illustrate and describe the same, in Fig. 1 I have shown a leash which may include a leather handle 10, an extensible cord 12 and a snap-fastener 14, the snap fastener being for the purpose of attaching the leash to an animal collar or child's harness. The snap-fastener 14 may be connected by any suitable linkage, such as the link members 16 and 18, to a coupler link 20, the coupler link 20 being securely fastened to the coupler 22 to which the expansible spring cord cover 24 and the elastic cord 26 are attached. A similar coupler 22 and coupler link 24 provide a connection to the leather strap handle 10.

The coupler 22, as best shown in Figs. 3 and 4, may be a metallic member that is cylindrically shaped with a reduced threaded end 28. The coupler has an axial bore 30 therethrough, the bore communicating with an enlarged bore 32 beyond the threaded portion of the same. The coupler link is connected to the coupler 22 through a pair of openings 34 which receive the ends of the coupler link 20. A plug 35 may be soldered or otherwise secured in the end of the bore 32 after the cord has been connected to the coupler.

The elastic cord 26, which is preferably nylon because of its unusual strength, may be attached to the coupler 22 by being pulled through the bore 30 and a knot K tied in the end of the same, the knot being sufficiently large to occupy the bore 32 and prevent withdrawal of the cord through the bore 30.

The expansible spring cord cover 24 is preferably made of stainless steel spring wire wound to a diameter so that it can be threaded over the screw threads 36 on the end of the coupler 22. In this manner, when the cord 26 and spring cord cover 24 have been assembled to both of the coupler members 22, a cord has been formed which is not only elastic and stretchable, but which, due to the combined action of the elastic cord and the coiled spring member, will return the cord to normal length whenever all pull has been released on the cord. In addition, if an animal or a child takes a sudden jump forward, the cord will yieldingly, with ever greater pressure, permit such forward movement, but when the same has ceased, the cord will again return to normal length.

As previously stated, one of the objects of the provision of the stainless steel coiled spring cover is to provide an attractive leash. To this end, any desirable design may be worked out in the turning of the coiled spring cover member. For example, the spring may be wound as shown in Fig. 5 in pentagon shaped coils 40, or the winding of the spring and the cover may be in various shapes for different lengths so that in the overall length an attractive and varied appearance has been produced.

I contemplate that changes and modifications may be made in the exact details shown and I do not wish to be limited in any particular; rather what I desire to secure and protect by Letters Patent of the United States is:

1. A non-twistable stretchable leash comprising a flexible leather handle, said handle having a link connected to one end of the same, a cylindrical coupler connected to said link, said coupler having a reduced threaded end and having a bore throughout its length, an elastic cord fastened in the bore of said coupler, said cord surrounded by an expansible coiled spring member, said coiled spring member fastened on the threads at the end of said coupler, the opposite end of said cord and spring member being fastened in a similar manner to a similar coupler, a link attached to the end of said second coupler and a snap-fastener connected to said link, said coiled spring member being wound with alternate polygonal area outline and circular area outline for defined distances throughout its length.

2. A non-twistable stretchable leash comprising a flexible leather handle, said handle having a link connected to one end of the same, a cylindrical coupler connected to said link, said coupler having a reduced threaded end and having a bore throughout its length, said bore being enlarged beyond said threaded portion, an elastic cord fastened in the enlarged bore of said coupler, said cord surrounded by a coiled spring member, said coiled spring member fastened on the threads at the end of said coupler, the opposite end of said cord and spring member being fastened in a similar manner to a similar coupler, a link attached to the end of said coupler and a snap-fastener connected to said link.

References Cited in the file of this patent

UNITED STATES PATENTS

| | | |
|---|---|---|
| 810,336 | Higgins | Jan. 16, 1906 |
| 2,194,736 | De Bruler | Mar. 26, 1940 |

FOREIGN PATENTS

| | | |
|---|---|---|
| 15,521 | Great Britain | 1915 |
| 426,081 | Great Britain | Mar. 27, 1935 |